July 24, 1962    L. WALDICK    3,046,499
ARRANGEMENT FOR ADJUSTING THE FREQUENCY-DEPENDENT
ATTENUATION IN SUBMARINE CABLE SYSTEM
Filed Oct. 31, 1960

INVENTOR.
Leo Waldick
BY Michael S. Striker
Attorney

United States Patent Office 3,046,499
Patented July 24, 1962

3,046,499
ARRANGEMENT FOR ADJUSTING THE FREQUENCY-DEPENDENT ATTENUATION IN SUBMARINE CABLE SYSTEM
Leo Waldick, Koln-Dellbruck, Germany, assignor to Felten & Guilleaume Carlswerk Aktiengesellschaft, Koln-Mulheim, Germany
Filed Oct. 31, 1960, Ser. No. 66,263
Claims priority, application Germany Oct. 31, 1959
5 Claims. (Cl. 333—28)

The present invention concerns frequency-dependent attenuation correcting devices which are designed for being inserted in submarine cable systems equipped with repeater stations, both the attenuation correcting devices and the repeater stations being operated while being submerged together with the pertaining cable portions.

In submarine cable systems or installations of this kind the frequency-dependent attenuation characteristic of the submarine cable does not tally exactly with the likewise frequency-dependent amplification characteristic of the submarine amplifier or repeater equipment. This results in attenuation distortions or in residual attenuations which are likewise frequency-dependent. On the other hand, it has been found also that it is not possible to predetermine with sufficient accuracy before a cable is laid out in the ocean which will be its frequency-dependent attenuation characteristic after being laid out. Thus it is sometimes necessary to insert, during the course of laying out a cable, into the cable by splicing an intermediate attenuation correcting device after a certain number of sections connected by repeater stations have been disposed of, such insertion of correcting devices being intended to reduce as much as possible all those attenuation distortions which may appear in the cable system up to the particular point.

In order to obtain as complete as possible a correction or equalization of the prevailing attenuation distortions, it is most desirable to have at ones disposal an adjustable correcting device or a plurality thereof so that the correction device may be adjusted or selected in such a manner that the most favorable or suitable frequency characteristic is obtained for reducing the prevailing attenuation distortions.

The insertion of the correcting devices into the submarine cable is ordinarily carried out aboard ship during the process of laying out the cables. However, it appears to be uneconomical and also undesirable in view of the expected reliability of the cable performance, to carry out aboard the cable ship those operations which ordinarily are being carried out in the course of the manufacture of the sealed water-tight submersible housings for the correcting devices. Therefore it would be of great advantage if the attenuation correcting device to be inserted in the submarine cable is available in a completely sealed submersible housing. Ordinarily, such a pre-manufactured attenuation correcting device is not adjustable after the housing is sealed. Thus, due to the varying attenuation conditions to be met, it would be necessary to have available a substantial number of differently adjusted attenuation correcting devices. Since attenuation correction is a very delicate process a prohibitively great number of fixedly adjusted types of correcting devices would be required. If, therefore, only a selected smaller number of adjusted correcting devices is kept on hand, the result would be that in many or most cases only approximately suitable correcting devices would have to be used so that the actual attenuation distortion would not be sufficiently corrected if one of these units is used.

Of course, the just-mentioned difficulties could be avoided if the attenuation correcting device is adjustable from the outside of its housing in such a manner as to determine its frequency-dependent characteristic. However, known attenuation correcting devices having mechanically operable adjusting devices including rotatable shafts passing through the wall of the housing entail the substantial danger of being unreliable in the long run particularly due to the possibility of water seeping into the housing along the shaft when the device is submersed at great depth.

It is therefore a main object of this invention to provide for an arrangement for adjusting the frequency-dependent attenuation in submarine cable systems without entailing the above-mentioned disadvantages or difficulties.

It is another object of this invention to provide for an attenuation correcting system in which the attenuation is adjustable from the outside purely electrically without mechanical means applied from the outside.

With above objects in view, an arrangement for adjusting the frequency-dependent attenuation in submarine cable systems equipped with repeater stations comprises, according to the invention, in combination, a sealed housing; a plurality of differently pre-adjusted attenuation correcting devices arranged within said housing; input means for introducing from one side electrical energy into the arrangement and output means for delivering energy, after passage through the arrangement, to a cable portion connected to said output means; and electromechanical means operable by electric energy introduced through said input means for selectively placing any one of said plurality of correcting devices in circuit between said input and output means, whereby depending upon prevailing conditions the best suited one of said correcting devices can be placed in circuit in said submarine cable system, without the necessity of opening said sealed housing.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

FIG. 3 is an enlarged diagrammatic illustration of control means forming part of the embodiment illustrated by FIGS. 1, 2 and 2a.

Figure 2A:
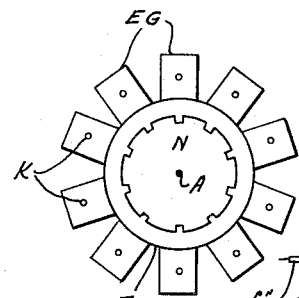
FIG. 2a is a diagrammatic end view of some portions of the arrangement illustrated by FIG. 2.
Figure 2:
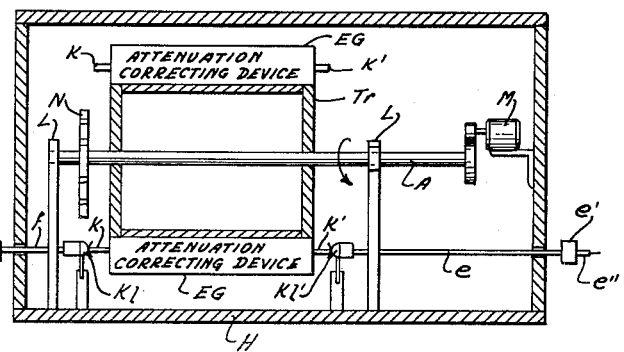
FIG. 2 is a diagrammatic, partly sectional elevation of an arrangement according to the invention, most of the electrical circuits being omitted for the sake of clarity.
Figure 3:
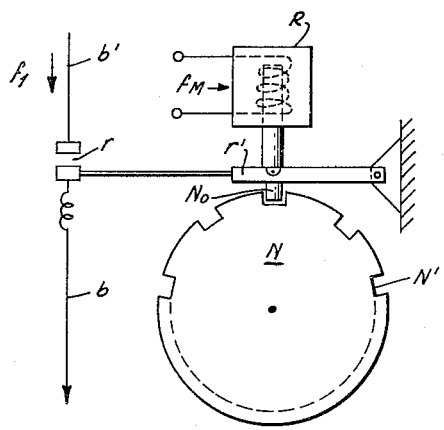

Referring first to FIGS. 2 and 2a, a sealed housing H is provided, with an input cable $f$ passing through one end wall and permanently and tightly sealed therein, and with an output cable $e$ passing through the opposite end wall and also tightly sealed therein. A portion of the submarine cable or any other connection $f''$ may be joined in conventional manner with the input cable $f$ at $f'$. Similarly the output cable $e$ may be joined at $e'$ with a portion $e''$ of the submarine cable pertaining to that part of the cable system already laid out. Within the housing H is arranged a drum Tr supported by a shaft A which is rotatable in bearings L. The drum Tr serves as a carrier member for supporting a plurality of conventional attenuation correcting devices EG, of any suitable conventionally known type, mounted at equal spacings around the circumference of the drum Tr as can be seen particularly from FIG. 2a. The shaft A and thereby the drum together with all of the correcting devices EG can be rotated by means of a motor M, preferably via gears as shown. By such rotation any one of the correcting devices EG can be moved into a predetermined operative position. In FIG. 2 the device EG nearest to the bottom of the housing H is in such operative position as will be explained here below.

Figure 4:
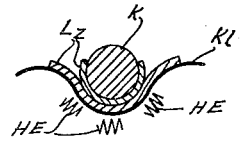
FIG. 4 illustrates at a larger scale a detail of the contact and terminal connection provided for the above mentioned embodiment.

Every one of the correcting devices EG has at least one input terminal K and one output terminal K' located at opposite ends of the device. The input cable $f$ terminates in a stationary input contact K1 shown at a larger scale in FIG. 4. Similarly the output cable $e$ terminates in a similar stationary output contact K1'. These input and output contacts are so located that when any one of the correcting devices EG are moved into the above mentioned operative position the respective input and output terminals K and K' thereof are in engagement with the above mentioned input and output contacts K1 and K1', respectively. Preferably the contacts K1 and K1' are made of substantially resilient material and formed as illustrated by FIG. 4 so that the terminals K and K', respectively, snap into engagement when correctly positioned.

In order to control the positioning of a desired one of the various differently pre-adjusted correcting devices EG and in order ot arrest the drum Tr with its correcting devices in a desired position, a circumferentially notched wheel N is mounted on the shaft A, the individual notches N' having a fixed relation to the circumferential distribution of the various correcting devices EG. Cooperating with the wheel N is a locking pawl $N_0$ which is capable of engaging any one of the notches N' and of riding on the circumference of the wheel N between notches when lifted out of engagement with any one of the notches N'. The locking pawl $N_0$ is operable by, or jointly with, the switch arm $r'$ of a relay R. The arm $r'$ operates at its free end a normally open contact $r$ which is connected in circuit with the motor M. Whenever the relay R is energized by the application of electric energy to its coil it attracts its armature so as to lift the arm $r'$ whereby simultaneously the contact $r$ is moved to closed position and the pawl $N_0$ is moved out of engagement with the respective notch N'. By closing of the contact $r$ the motor M is energized and will start rotating the disc N. Even if the coil of the relay R has been energized only for a comparatively brief instant the contact $r$ will remain closed because the tip of the pawl $N_0$ will now ride on the circumference of the wheel N until the pawl drops into the next notch N'. Then, the contact $r$ is opened again and the motor is de-energized, the rotational movement is discontinued and at the same time the drum is arrested in the attained position by the engagement of the pawl $N_0$ with the respective notch N'. This procedure may be repeated as often as desired until a particular correcting device has been moved into its operative position defined by the fact that in this position the particular correcting device is placed in circuit with the input and output cables $f$ and $e$, respectively, by the engagement between the contacts and terminals K, K1 and K', K1', respectively.

Figure 1:
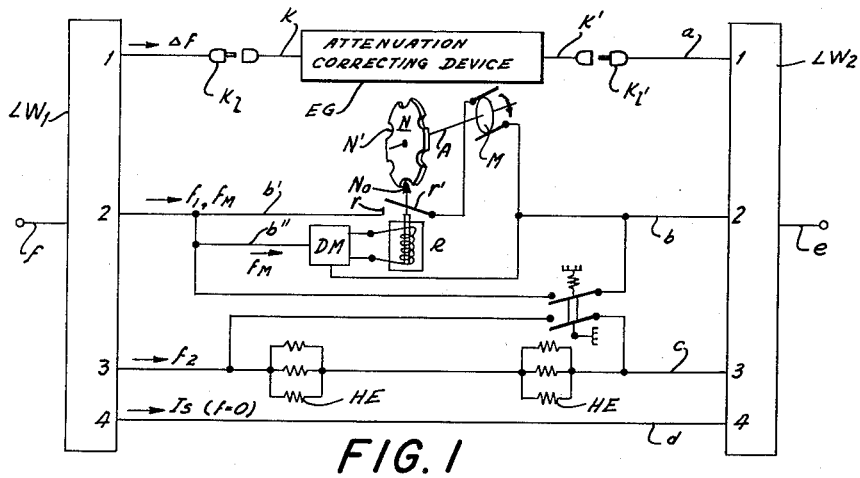
FIG. 1 is a schematic diagram illustrating the basic features of an arrangement according to the invention, most of the structural components being omitted.

The electrical circuit arrangement of the whole system is illustrated by FIG. 1.

The input cable $f$ is connected with a channeling device $LW_1$ which is capable of channeling different forms of electrical energy introduced through the input cable $f$, to the various components of the arrangement. The output cable $e$ is connected with a similar channeling device $LW_2$. The just-mentioned channeling devices will permit to pass signal frequencies located within a predetermined frequency band $\Delta f$ through that correcting device EG which is in operative position, i.e. as illustrated in FIG. 1 where the terminal K is in engagement with the contact K1 and thereby with point 1 of the channeling device $LW_1$, and wherein the terminal K' is in engagement with the contact K1' and thereby with the point 1 of the device $LW_2$. The connections $b$ and $b'$ between the respective points 2 of the channeling devices constitute the power supply line for the motor M and include also the contact pair $r$ above described. The channeling devices $LW_1$ and $LW_2$ are designed to channel only a first control frequency $f_1$ through this connection. The line $c$ between the respective points 3 of the channeling devices serves a special purpose described further below, and the channeling devices are designed to channel through this line $c$ only another control frequency $f_2$. Finally, a further line $d$ may be provided between the points 4 of the channeling devices for the purpose of transmitting between the cables $f$ and $e$ a direct current Is, i.e. a frequency $f=0$ which may be used for operating the repeater stations that may be connected in the cable system.

For operating and energizing the relay R a demodulator DM is connected between the coil of the relay R and a junction point in the line $b'$ between the channeling device $LW_1$ and the relay contact $r$. For operating the relay R a modulating frequency $f_M$ is superimposed over the first control frequency $f_1$ so that after demodulation in the demodulator DM the relay R will be energized whenever a modulating signal at the frequency $f_M$ is superimposed over the first control frequency $f_1$.

The operation of the whole arrangement will be understood readily if one considers that for instance in a 60-channel cable system a signal frequency band ranging from 24 to 264 kilocycles is used. While the first control frequency $f_1$ is chosen at 1000 cycles, the modulating frequency $f_M$ is chosen at 50 cycles, and finally the further control frequency $F_2$ is chosen at 2000 cycles. The channeling devices $LW_1$ and $LW_2$ are of conventional type and comprise filter circuits capable of separating and channeling the different frequencies mentioned above.

In practice, after some suitable connection $f''$ has been connected with the input cable at $f$ at $f'$, signal frequencies within the above mentioned frequency band may be introduced into the arrangement at $f$ and will pass through that one of the correcting devices EG which happens to be in operative position. The attenuation conditions can be tested and if it is found that the particular correcting device EG being in operative position does not furnish the desired or necessary correction than an adjustment of the arrangement can be carried out. For this purpose the first control frequency $f_1$ is applied which however has at first no effect because the relay R is not energized. Now the modulating frequency $f_M$ is superimposed over the frequency $f_1$, acting as carrier frequency, for a brief period whereby the relay R is energized, the contact $r$ is closed, the pawl and notch engagement is removed so that the motor M will be able to turn under the action of the frequency $f_1$ the drum Tr an amount determined by the spacing between consecutive notches N' until the next following correcting device EG arrives in operative position. Now the attenuation test can be repeated. If still no satisfactory conditions are obtained the above procedure may be repeated until the best suited correcting device is in operative position.

Since it is most desirable that the line connections across the arrangement do not rely solely on a frictional engagement between the terminals and contacts, means are proposed for establishing a permanent soldered connection. For this purpose, a number of heating elements HE are arranged in the vicinity of the input and output contacts K1 and K1' as shown in FIG. 1 and FIG. 4. The sets of heating elements HE are connected in the above mentioned line $c$. Thus, if now a frequency $f_2$ is introduced at $f$ the heating elements HE will be energized and will furnish sufficient heat for producing a soldered connection between the interengaged contacts and terminals K, K1 and K', K1', respectively, provided that at least the contacts or the terminals, preferably however both are coated with a pre-applied layer of solder and flux as marked at $L_z$ in FIG. 4. The time required for effecting such a soldering operation can be easily established in advance by suitable experimentation taking into account the wattage available at the particular point of operation. On the other hand, since it can be expected that heating elements HE are available which have a very distinct temperature-dependent voltage-current characteristic, the observation of the change of current consumption at a particular voltage of the frequency $f_2$ during a soldering operation can be used advantageously for determining when the desired soldering temperature is reached.

It may be advantageous to have the contacts and terminals which are to be connected by soldering, pre-plated with a material which favors and facilitates the soldering process.

Referring to FIG. 1, it should be understood that the demodulator is shown connected only by one conductor $b''$ with the line $b'$ since this appears to be sufficient for understanding the invention. However, the demodulator may be connected, at its other end, also to ground or to the line $b$.

It will be understood that each of the elements described above or two or more together, may also find a useful application in other types of arrangements for adjusting the frequency-dependent attenuation in submarine cables systems differing from the types described above.

While the invention has been illustrated and described as embodied in an arrangement for adjusting the frequency-dependent attenuation in submarine cable systems without external mechanical adjusting means, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. An arrangement for adjusting the frequency-dependent attenuation in submarine cable systems equipped with repeater stations, comprising, in combination, a sealed housing; a carrier member rotatably supported in said housing; electromechanical means including drive means operable by application of a predetermined first control frequency, for rotating said carrier member upon application of electric energy at said first control frequency; a plurality of differently pre-adjusted attenuation correcting devices operable at frequencies within a predetermined signal frequency band and distinct from said first control frequency, each having at least one input and one output terminal, mounted on said carrier member for being sequentially movable by rotary movement of said carrier member into a predetermined operative position; control means for starting and terminating said rotary movement of said carrier member when one of said correcting devices is in said operative position, and including relay means having coil means energizable by a second predetermined control frequency distinct from said first control frequency and from said frequency band and normally open contact means operable by energization of said coil means and connected in circuit with said drive means and including a wheel provided with a plurality of recesses and coupled with said carrier member, and a locking pawl positioned to engage one of said recesses whenever one of said correcting devices is moved into said operative position, said pawl means being movable into disengaged position by said relay means jointly with the movement of said contact means into closed position, whereby upon brief energization of said coil means the circuit for said drive means is closed, said locking pawl is disengaged and said carrier member is turned until a sequent correcting device is moved into said operative position, said pawl means then arresting said correcting device in that position; and input and output means respectively connectable to portions of the submarine cable into which the arrangement is to be inserted, said input and output means including at least one input and one output contact mounted on the inside of said housing and positioned to be in conductive engagement with said input and output terminals, respectively, of any one of said correcting devices when the latter is in operative position, said input and output means being capable of channeling electrical energy transmitted at frequencies within said frequency band and representing intelligence through a correcting device being in operative position and of channeling selectively outside electrical energy at said first control frequency to said electromechanical means and at said second control frequency to said control means, whereby, when said output means are connected to one portion of submarine cable, the prevailing attenuation can be adjusted from the outside by selecting the best suited one of said correcting devices by means of rotarily moving one after the other of said correcting devices into operative position until the best suited one is found.

2. An arrangement as claimed in claim 1 including soldering means operable by electrical energy introduced through said input means and arranged for producing, upon application of such energy, a soldered connection between said input and output contacts and said input and output terminals, respectively, of a corrective device placed in operative position.

3. An arrangement as claimed in claim 1 including soldering means operable by electrical energy in the form of a third control frequency distinct from said control frequency band and from said first and second control frequencies and introduced through said input means and arranged for producing, upon application of such energy, a soldered connection between said input and output contacts and said input and output terminals, respectively, of a corrective device placed in operative position.

4. An arrangement as claimed in claim 3, wherein said soldering means comprise soldering material pre-applied to at least selected ones of said contacts and terminals and electrical heating elements arranged in the vicinity of said input and output contacts and capable of being energized by said third control frequency.

5. An arrangement as claimed in claim 1 wherein said second control frequency is a modulating frequency superimposed on said first control frequency, demodulator means being connected between said relay coil means and a junction point between said relay contact means and said input means for applying said modulating frequency to said coil means.

References Cited in the file of this patent
UNITED STATES PATENTS

| | | |
|---|---|---|
| 1,743,141 | Ilgenfritz | Jan. 14, 1930 |
| 2,102,138 | Stieby | Dec. 14, 1937 |
| 2,848,693 | Harges et al. | Aug. 19, 1958 |